(12) United States Patent
Fellenstein et al.

(10) Patent No.: US 8,387,058 B2
(45) Date of Patent: Feb. 26, 2013

(54) MINIMIZING COMPLEX DECISIONS TO ALLOCATE ADDITIONAL RESOURCES TO A JOB SUBMITTED TO A GRID ENVIRONMENT

(75) Inventors: Craig Fellenstein, Brookfield, CT (US); Rick Allen Hamilton, Charlottesville, VA (US); Joshy Joseph, Poughkeepsie, NY (US); James Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1138 days.

(21) Appl. No.: 12/143,776

(22) Filed: Jun. 21, 2008

(65) Prior Publication Data

US 2008/0256228 A1 Oct. 16, 2008

Related U.S. Application Data

(63) Continuation of application No. 10/756,134, filed on Jan. 13, 2004, now Pat. No. 7,406,691.

(51) Int. Cl.
*G06F 9/46* (2006.01)
*G06F 17/00* (2006.01)

(52) U.S. Cl. .......................................... 718/104; 706/45
(58) Field of Classification Search .................. 718/104; 706/45

See application file for complete search history.

(56) References Cited

U.S. PATENT DOCUMENTS

| | | | |
|---|---|---|---|
| 4,096,561 A | 6/1978 | Trinchieri | |
| 4,591,980 A | 5/1986 | Huberman et al. | |
| 5,220,674 A | 6/1993 | Morgan | |
| 5,325,525 A | 6/1994 | Shan et al. | |
| 5,392,430 A | 2/1995 | Chen et al. | |
| 5,416,840 A | 5/1995 | Cane et al. | |
| 5,559,978 A | 9/1996 | Spilo | |
| 5,630,156 A | 5/1997 | Privat et al. | |
| 5,640,569 A | 6/1997 | Miller et al. | |
| 5,655,081 A | 8/1997 | Bonnell | |
| 5,729,472 A | 3/1998 | Seiffert | |
| 5,881,238 A | 3/1999 | Aman et al. | |
| 5,884,046 A | 3/1999 | Antonov | |
| 5,905,975 A | 5/1999 | Ausubel | |
| 5,931,911 A | 8/1999 | Remy et al. | |
| 5,960,176 A | 9/1999 | Kuroki et al. | |
| 5,978,583 A | 11/1999 | Ekanadham | |

(Continued)

FOREIGN PATENT DOCUMENTS

| CN | 1336054 | 2/2002 |
|---|---|---|
| EP | 0790559 | 8/1997 |

(Continued)

OTHER PUBLICATIONS

Office Action, U.S. Appl. No. 11/031,403, filed Jan. 6, 2005, Mailed Apr. 24, 2009.

(Continued)

*Primary Examiner* — MengYao Zhe
(74) *Attorney, Agent, or Firm* — Mark C. Vallone; Amy J. Pattillo

(57) ABSTRACT

At least one decision to allocate additional resources to at least one previously submitted job is stored in a decision cache, wherein said the least one decision is stored according to at least one characteristic of the at least one previously submitted job. When another job is submitted to the grid environment needs additional resources, the characteristic of the currently submitted job is compared with the characteristics of previous submitted jobs. If there is a match, then the previously made decision associated with the matching characteristic controls allocation of additional resources for the currently submitted job, such that complex decision making for allocation of additional resources is minimized by reusing previously stored decisions to allocate additional resources.

8 Claims, 7 Drawing Sheets

DECISION LOGIC CACHE TABLE 1000

| STATE | JOB PRIORITY | DECISION CODE | ACTION EXECUTED |
|---|---|---|---|
| 000 | 1 | 001 | TAKE NO ACTION |
| 000 | 2 | 002 | TAKE NO ACTION |
| 000 | 3 | 003 | TAKE NO ACTION |
| 000 | 4 | 004 | TAKE NO ACTION |
| 100 | 1 | 101 | ALLOW UNLIMITED CPU's |
| 100 | 2 | 102 | ALLOW 10 CPU's |
| 100 | 3 | 103 | ALLOW 3 CPU's |
| 100 | 4 | 104 | ALLOW NO ADDITIONAL CPU's |

U.S. PATENT DOCUMENTS

| | | |
|---|---|---|
| 5,996,013 A | 11/1999 | Delp et al. |
| 6,003,075 A | 12/1999 | Arendt et al. |
| 6,021,398 A | 2/2000 | Ausubel |
| 6,023,612 A | 2/2000 | Harris et al. |
| 6,038,560 A | 3/2000 | Wical |
| 6,049,828 A | 4/2000 | Deb |
| 6,064,810 A | 5/2000 | Raad et al. |
| 6,067,580 A | 5/2000 | Aman et al. |
| 6,119,186 A | 9/2000 | Watts et al. |
| 6,134,680 A | 10/2000 | Yeomans |
| 6,154,787 A | 11/2000 | Urevig et al. |
| 6,167,445 A | 12/2000 | Gai et al. |
| 6,182,139 B1 | 1/2001 | Brendel |
| 6,304,892 B1 | 10/2001 | Bhoj et al. |
| 6,310,889 B1 | 10/2001 | Parsons et al. |
| 6,324,656 B1 | 11/2001 | Gleichauf |
| 6,356,909 B1 | 3/2002 | Spencer |
| 6,370,565 B1 | 4/2002 | Van Gong |
| 6,397,197 B1 | 5/2002 | Gindlesperger |
| 6,418,462 B1 | 7/2002 | Xu |
| 6,430,711 B1 | 8/2002 | Sekizawa |
| 6,438,704 B1 | 8/2002 | Harris et al. |
| 6,452,692 B1 | 9/2002 | Yacoub |
| 6,453,376 B1 | 9/2002 | Fairman et al. |
| 6,463,454 B1 | 10/2002 | Lumelsky |
| 6,463,457 B1 | 10/2002 | Armentrout |
| 6,466,947 B2 | 10/2002 | Arnold et al. |
| 6,470,384 B1 | 10/2002 | O'Brien et al. |
| 6,480,955 B1 | 11/2002 | DeKoning et al. |
| 6,516,312 B1 | 2/2003 | Kraft et al. |
| 6,552,813 B2 | 4/2003 | Yacoub |
| 6,560,609 B1 | 5/2003 | Frey |
| 6,564,377 B1 | 5/2003 | Jayasimha |
| 6,567,935 B1 | 5/2003 | Figueroa |
| 6,578,160 B1 | 6/2003 | MacHardy, Jr. et al. |
| 6,594,684 B1 | 7/2003 | Hodjat et al. |
| 6,597,956 B1 | 7/2003 | Aziz et al. |
| 6,606,602 B1 | 8/2003 | Kolls |
| 6,615,373 B2 | 9/2003 | Elko et al. |
| 6,625,643 B1 | 9/2003 | Colby et al. |
| 6,633,868 B1 | 10/2003 | Min et al. |
| 6,640,241 B1 | 10/2003 | Ozzie et al. |
| 6,647,373 B1 | 11/2003 | Carlton-Foss |
| 6,654,759 B1 | 11/2003 | Brunet et al. |
| 6,654,807 B2 | 11/2003 | Farber et al. |
| 6,671,676 B1 | 12/2003 | Shacham |
| 6,681,251 B1 | 1/2004 | Leymann |
| 6,697,801 B1 | 2/2004 | Eldredge et al. |
| 6,701,342 B1 | 3/2004 | Bartz et al. |
| 6,714,987 B1 | 3/2004 | Amin et al. |
| 6,717,694 B1 | 4/2004 | Fukunaga et al. |
| 6,735,200 B1 | 5/2004 | Novaes |
| 6,738,736 B1 | 5/2004 | Bond |
| 6,748,416 B2 | 6/2004 | Carpenter |
| 6,752,663 B2 | 6/2004 | Farrell et al. |
| 6,799,208 B1 | 9/2004 | Sankaranarayan et al. |
| 6,816,905 B1 | 11/2004 | Sheets et al. |
| 6,816,907 B1 | 11/2004 | Mei et al. |
| 6,941,865 B2 | 9/2005 | Kato |
| 6,954,739 B1 | 10/2005 | Bouillet et al. |
| 6,963,285 B2 | 11/2005 | Fischer et al. |
| 7,050,184 B1 | 5/2006 | Miyamoto |
| 7,055,052 B2 | 5/2006 | Chalasani et al. |
| 7,080,077 B2 | 7/2006 | Ramamurthy et al. |
| 7,086,086 B2 | 8/2006 | Ellis |
| 7,093,259 B2 | 8/2006 | Pulsipher et al. |
| 7,096,248 B2 | 8/2006 | Masters et al. |
| 7,123,375 B2 | 10/2006 | Nobutani et al. |
| 7,124,062 B2 | 10/2006 | Gebhart |
| 7,171,654 B2 | 1/2007 | Werme et al. |
| 7,181,302 B2 | 2/2007 | Bayne et al. |
| 7,181,743 B2 | 2/2007 | Werme et al. |
| 7,234,032 B2 | 6/2007 | Durham et al. |
| 7,243,121 B2 | 7/2007 | Neiman et al. |
| 7,243,147 B2 | 7/2007 | Hodges et al. |
| 7,245,584 B2 | 7/2007 | Goringe et al. |
| 7,266,547 B2 | 9/2007 | Bao et al. |
| 7,269,757 B2 | 9/2007 | Lieblich et al. |
| 7,272,732 B2 | 9/2007 | Farkas et al. |
| 7,283,935 B1 | 10/2007 | Pritchard et al. |
| 7,293,092 B2 | 11/2007 | Sukegawa |
| 7,340,654 B2 | 3/2008 | Bigagli et al. |
| 7,406,691 B2 | 7/2008 | Fellenstein et al. |
| 7,426,267 B1 | 9/2008 | Caseau |
| 7,433,931 B2 | 10/2008 | Richoux |
| 7,437,675 B2 | 10/2008 | Casati et al. |
| 7,451,106 B1 | 11/2008 | Gindlesperger |
| 7,464,159 B2 | 12/2008 | Di Luoffo et al. |
| 7,467,196 B2 | 12/2008 | Di Luoffo et al. |
| 7,472,079 B2 | 12/2008 | Fellenstein et al. |
| 7,472,112 B2 | 12/2008 | Pfleiger et al. |
| 7,502,850 B2 | 3/2009 | Fellenstein et al. |
| 7,533,168 B1 | 5/2009 | Pabla et al. |
| 7,533,170 B2 | 5/2009 | Fellenstein et al. |
| 7,552,437 B2 | 6/2009 | Di Luoffo et al. |
| 7,562,035 B2 | 7/2009 | Fellenstein et al. |
| 7,562,143 B2 | 7/2009 | Fellenstein et al. |
| 7,571,120 B2 | 8/2009 | Fellenstein et al. |
| 7,584,274 B2 | 9/2009 | Bond et al. |
| 7,590,623 B2 | 9/2009 | Fellenstein et al. |
| 7,620,706 B2 | 11/2009 | Jackson |
| 7,664,844 B2 | 2/2010 | Di Luoffo et al. |
| 7,668,741 B2 | 2/2010 | Ernest et al. |
| 7,707,288 B2 | 4/2010 | Dawson et al. |
| 7,712,100 B2 | 5/2010 | Fellenstein et al. |
| 7,734,679 B2 | 6/2010 | Di Luoffo et al. |
| 7,739,155 B2 | 6/2010 | Fellenstein et al. |
| 7,743,142 B2 | 6/2010 | Fellenstein et al. |
| 7,761,557 B2 | 7/2010 | Fellenstein et al. |
| 7,788,375 B2 | 8/2010 | Fellenstein et al. |
| 7,793,308 B2 | 9/2010 | Gusler et al. |
| 2002/0023168 A1 | 2/2002 | Bass et al. |
| 2002/0057684 A1 | 5/2002 | Miyamoto et al. |
| 2002/0072974 A1 | 6/2002 | Pugliese et al. |
| 2002/0103904 A1 | 8/2002 | Hay |
| 2002/0116488 A1 | 8/2002 | Subramanian et al. |
| 2002/0147578 A1 | 10/2002 | O'Neil et al. |
| 2002/0152305 A1 | 10/2002 | Jackson et al. |
| 2002/0152310 A1 | 10/2002 | Jain et al. |
| 2002/0165979 A1 | 11/2002 | Vincent |
| 2002/0171864 A1 | 11/2002 | Sesek |
| 2002/0188486 A1 | 12/2002 | Gil et al. |
| 2003/0011809 A1 | 1/2003 | Suzuki et al. |
| 2003/0023499 A1 | 1/2003 | Das et al. |
| 2003/0036886 A1 | 2/2003 | Stone |
| 2003/0041010 A1 | 2/2003 | Yonao-Cowan |
| 2003/0058797 A1 | 3/2003 | Izmailov et al. |
| 2003/0088671 A1 | 5/2003 | Klinker et al. |
| 2003/0101263 A1 | 5/2003 | Bouillet et al. |
| 2003/0105868 A1 | 6/2003 | Kimbrel et al. |
| 2003/0108018 A1 | 6/2003 | Dujardin et al. |
| 2003/0110419 A1 | 6/2003 | Banerjee et al. |
| 2003/0112809 A1 | 6/2003 | Bharali et al. |
| 2003/0115099 A1 | 6/2003 | Stanley et al. |
| 2003/0120701 A1 | 6/2003 | Pulsipher et al. |
| 2003/0126240 A1 | 7/2003 | Vosseler |
| 2003/0126265 A1 | 7/2003 | Aziz et al. |
| 2003/0128186 A1 | 7/2003 | Breslin et al. |
| 2003/0140143 A1 | 7/2003 | Wolf et al. |
| 2003/0145084 A1 | 7/2003 | Mcnerney |
| 2003/0161309 A1 | 8/2003 | Karuppiah |
| 2003/0172061 A1 | 9/2003 | Krupin et al. |
| 2003/0191795 A1 | 10/2003 | Bernardin et al. |
| 2003/0195813 A1 | 10/2003 | Pallister et al. |
| 2003/0200347 A1 | 10/2003 | Weitzman |
| 2003/0204485 A1 | 10/2003 | Triggs |
| 2003/0204758 A1 | 10/2003 | Singh |
| 2003/0212782 A1 | 11/2003 | Canali et al. |
| 2004/0003077 A1 | 1/2004 | Bantz |
| 2004/0015976 A1 | 1/2004 | Lam |
| 2004/0019624 A1 | 1/2004 | Sukegawa |
| 2004/0059729 A1 | 3/2004 | Krupin et al. |
| 2004/0064548 A1 | 4/2004 | Adams et al. |
| 2004/0078471 A1 | 4/2004 | Yang |
| 2004/0093381 A1 | 5/2004 | Hodges et al. |
| 2004/0095237 A1 | 5/2004 | Chen et al. |
| 2004/0098606 A1 | 5/2004 | Tan et al. |

| | | | |
|---|---|---|---|
| 2004/0103339 | A1 | 5/2004 | Chalasani et al. |
| 2004/0120256 | A1 | 6/2004 | Park |
| 2004/0128186 | A1 | 7/2004 | Breslin et al. |
| 2004/0128374 | A1 | 7/2004 | Hodges et al. |
| 2004/0145775 | A1 | 7/2004 | Kubler et al. |
| 2004/0193461 | A1 | 9/2004 | Keohane et al. |
| 2004/0213220 | A1 | 10/2004 | Davis |
| 2004/0215590 | A1 | 10/2004 | Kroening |
| 2004/0215973 | A1 | 10/2004 | Kroening |
| 2004/0225711 | A1 | 11/2004 | Burnett et al. |
| 2005/0015437 | A1 | 1/2005 | Strait |
| 2005/0021349 | A1 | 1/2005 | Cheliotis et al. |
| 2005/0021742 | A1 | 1/2005 | Yemini et al. |
| 2005/0027691 | A1 | 2/2005 | Brin et al. |
| 2005/0027785 | A1 | 2/2005 | Bozak et al. |
| 2005/0041583 | A1 | 2/2005 | Su et al. |
| 2005/0044228 | A1 | 2/2005 | Birkestrand et al. |
| 2005/0065994 | A1 | 3/2005 | Creamer et al. |
| 2005/0071843 | A1 | 3/2005 | Guo et al. |
| 2005/0108394 | A1 | 5/2005 | Braun |
| 2005/0120160 | A1 | 6/2005 | Plouffe et al. |
| 2005/0132041 | A1 | 6/2005 | Kundu |
| 2005/0138162 | A1 | 6/2005 | Byrnes |
| 2005/0138175 | A1 | 6/2005 | Kumar et al. |
| 2005/0149294 | A1 | 7/2005 | Gebhart |
| 2005/0160423 | A1 | 7/2005 | Bantz et al. |
| 2005/0182838 | A1 | 8/2005 | Sheets et al. |
| 2005/0187797 | A1 | 8/2005 | Frost |
| 2005/0187977 | A1 | 8/2005 | Frost |
| 2005/0192968 | A1 | 9/2005 | Beretich et al. |
| 2005/0234937 | A1 | 10/2005 | Ernest et al. |
| 2005/0257079 | A1 | 11/2005 | Arcangeli |
| 2005/0283788 | A1 | 12/2005 | Bigagli et al. |
| 2006/0047802 | A1 | 3/2006 | Iszlai et al. |
| 2006/0064698 | A1 | 3/2006 | Miller et al. |
| 2006/0069621 | A1 | 3/2006 | Chang et al. |
| 2006/0075041 | A1 | 4/2006 | Antonoff et al. |
| 2006/0075042 | A1 | 4/2006 | Wang et al. |
| 2006/0149576 | A1 | 7/2006 | Ernest et al. |
| 2006/0149652 | A1 | 7/2006 | Fellenstein et al. |
| 2006/0288251 | A1 | 12/2006 | Jackson |
| 2006/0294218 | A1 | 12/2006 | Tanaka et al. |
| 2006/0294238 | A1 | 12/2006 | Armentrout et al. |
| 2007/0022425 | A1 | 1/2007 | Jackson |
| 2007/0250489 | A1 | 10/2007 | Bao et al. |
| 2008/0168451 | A1 | 7/2008 | Challenger et al. |
| 2008/0222025 | A1 | 9/2008 | Fellenstein et al. |
| 2008/0306866 | A1 | 12/2008 | Fellenstein et al. |
| 2009/0083425 | A1 | 3/2009 | Bozak et al. |
| 2009/0216883 | A1 | 8/2009 | Fellenstein et al. |
| 2009/0228892 | A1 | 9/2009 | Di Luoffo et al. |
| 2009/0240547 | A1 | 9/2009 | Fellenstein et al. |
| 2009/0259511 | A1 | 10/2009 | Fellenstein et al. |
| 2009/0313299 | A1 | 12/2009 | Bonev et al. |

FOREIGN PATENT DOCUMENTS

| | | |
|---|---|---|
| EP | 1109353 | 6/2001 |
| EP | 1267552 | 12/2002 |
| JP | 08-272638 A | 10/1996 |
| JP | 2000-066904 A | 3/2000 |
| JP | 2000-194572 A | 7/2000 |
| JP | 2002-182932 A | 6/2002 |
| JP | 2003-067199 A | 3/2003 |
| JP | 2003-233515 A | 8/2003 |
| WO | 00/74313 A1 | 7/2000 |
| WO | 03/067494 A1 | 8/2003 |

OTHER PUBLICATIONS

Office Action, U.S. Appl. No. 11/031,426, filed Jan. 6, 2005, Mailed Apr. 1, 2009.
Notice of Allowance, U.S. Appl. No. 10/868,542, filed Jun. 15, 2004, Mailed Apr. 16, 2009.
Office Action, U.S. Appl. No. 11/767,502, filed Jun. 23, 2007, Zhendong Bao, Mailed Jun. 25, 2009, pp. 1-14.
Weng et al, "A cost-based online scheduling algorithm for job assignment on computational grids", Springer-Verlag Berlin Heidelberg, 2003, pp. 343-351.
Andrade et al, "Our grid: An approach to easily assemble grids with equitable resource sharing", Springer-Verlag Berlin Heidelberg, 2003, pp. 61-86.
Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.
Office Action, U.S. Appl. No. 10/940,452, filed Sep. 14, 2004, Craig Fellenstein, Mailed Jun. 23, 2009, pp. 1-13.
Office Action, U.S. Appl. No. 12/211,243, filed Sep. 16, 2008, Di Luoffo et al, Mailed Aug. 12, 2009, pp. 1-18.
Office Action, U.S. Appl. No. 11/031,542, filed Jan. 6, 2005, Dawson et al, Mailed Jul. 7, 2009, pp. 1-15.
Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.
Moore et al, "Managing Mixed Use Clusters with Cluster on Demand", Duke University, Nov. 2002.
"IBM Girds for Grids". McConnell, Chris. Enterprise System Journal, Oct. 2001, 1 page.
"Grid Computing set for big growth". Tanner, John, America's Network, vol. 107, No. 8, May 15, 2003, 6 pages.
Office Action, U.S. Appl. No. 12/125,892, filed May 22, 2008, mailed Aug. 26, 2009.
Office Action, U.S. Appl. No. 12/125,879, filed May 22, 2008, mailed Sep. 15, 2009.
Notice of Allowance, U.S. Appl. No. 12/194,989, filed Aug. 20, 2008, mailed Sep. 30, 2009.
Office Action, U.S. Appl. No. 11/031,426, filed Jan. 6, 2005, Carl Philip Gusler et al, Mailed Nov. 13, 2009, 21 pages.
Notice of Allowance, U.S. Appl. 11/031,403, filed Jan. 6, 2005, Leslie Mark Ernest et al., Mailed Oct. 5, 2009, 15 Pages.
In re Vincent Valentino Di Luoffo, Notice of Allowance, U.S. Appl. No. 12/211,243, filed Sep. 16, 2003, mail date Dec. 31, 2009, 18 pages.
In re Fellenstein, Final Office Action, U.S. Appl. No. 11/031,490, filed Jan. 6, 2005, mail date Dec. 28, 2009, 21 pages.
In re Fellenstein, Notice of Allowance, U.S. Appl. No. 12/364,469, filed Feb. 2, 2009, mail date Jan. 5, 2010, 27 pages.
In re Fellenstein, Supplemental Notice of Allowance, U.S. Appl. No. 12/364,469, filed Feb. 2, 2009, mail date Jan. 19, 2010, 7 pages.
In re Fellenstein, Notice of Allowance, U.S. Appl. No. 11/031,542, filed Jan. 6, 2005, mail date Dec. 8, 2009, 35 pages.
In re Fellenstein, Notice of Allowance, U.S. Appl. No. 10/940,452, filed Sep. 14, 2004, mail date Dec. 16, 2009, 28 pages.
In re Fellenstein, Notice of Allowance, U.S. Appl. No. 12/125,879, filed May 22, 2008, mail date Jan. 29, 2010, 24 pages.
In re Fellenstein, Notice of Allowance, U.S. Appl. No. 11/031,490, filed Jan. 6, 2005, mail date Mar. 9, 2010, 12 pages.
In re Fellenstein, Notice of Allowance, U.S. Appl. No. 12/359,216, filed Jan. 23, 2009, mail date Feb. 1, 2010, 25 pages.
In re Fellenstein, Office Action, U.S. Appl. No. 12/491,172, filed Jun. 24, 2009, mail date Apr. 6, 2010, 30 pages.
In re Fellenstein, Office Action, U.S. Appl. No. 12/196,287, filed Aug. 22, 2008, mail date Mar. 30, 2010, 24 pages.
In re Fellenstein, Office Action, U.S. Appl. No. 11/031,489, filed Jan. 6, 2005, mail date Apr. 5, 2010, 28 pages.
TTI Cluster Computing Services on Demand, ClusterOnDemand. com, publicly available and archived by Arhive.org on or before Dec. 8, 2004, 4 pages.
In re Fellenstein, Notice of Allowance, U.S. Appl. No. 12/364,469, filed Feb. 2, 2009, mail date Apr. 14, 2010, 16 pages.
In re Gusler, Office Action, U.S. Appl. No. 11/031,426, filed Jan. 6, 2005, mail date Apr. 29, 2010, 26 pages.
In re Fellenstein, USPTO Office Action, U.S. Appl. No. 12/435,370, filed May 4, 2009, mailing date Sep. 1, 2010, 43 pages.
In re Fellenstein, USPTO Notice of Allowance, U.S. Appl. No. 12/491,172, filed Jun. 24, 2009, mailing date Jun. 24, 2009, 17 pages.
In re Fellenstein, USPTO Office Action, U.S. Appl. No. 12/480,939, filed Jun. 9, 2009, mailing date Sep. 9, 2010, 13 pages.
In re Bao, USPTO Office Action, U.S. Appl. No. 11/767,502, filed Jun. 23, 2007, mailing date Jul. 12, 2010, 35 pages.

Hai et al, Fault-Tolerant Grid Architecture and Practice, Jul. 2003, vol. 18, pp. 423-433, J Computer Sci and Technology, 11 pages.

What's So Great About Grid, Ivan Schneider, Wall Street & Technology, New York, Jul. 2004, p. 24, 4 pages [recovered from Proquest on Sep. 12, 2008], 5 pages.

SGI and Platform Computing Announce Global Alliance for Grid Computing Solutions, PR Newswire, New York, Jul. 16, 2002, [recovered from Proquest on Sep. 12, 2008], 3 pages.

Avellino, G., et al, "The DataGrid Workload Management System: Challenges and Result"s, Journal of Grid Computing, Spinger Netherlands, vol. 2, No. 4, Dec. 2004, 353-367, 15 pages.

Ding et al "An Agent Model for Managing Distributed Software Resources in Grid Environment", 2003, ICCS, LNCS 2685, p. 971-980, 10 pages.

Al-Theneyan, Ahmed Hamdan, "A Policy-Based Resource Brokering Environment for Computations Grids", 2002, Ph. D, dissertation, Old Dominican Unviersity, US—Virginia, 238 pages.

Leff, Avraham, Rayfield, James T., Dias, Daniel M. "Service-Level Agreements and Commercial Grids." IEEE Internet Computing (Jul.-Aug. 2003): pp. 44-50. Discloses monitoring and enforcing SLAs (p. 48-49), 7 pages.

Hill, J R. "A Management platform for commercial Web Services." BT Technology Journal (Jan. 2004): vol. 22 No. 1 pp. 52-62) discloses SLA enforcement in grid environment, 11 pages.

Alexander Keller and Heiko Ludwig, "The WSLA Framework: Specifying and Monitoring Service Level Agreements forWeb Services." Journal of Network and Systems Management, vol. 11, No. 1, Mar. 2003 ( C 2003): p. 57-81, 25 pages.

Menasce, Daniel A., and Casalicchio, Emiliano "QoS in Grid Computing" IEEE Internet Computing (Jul.-Aug. 2004): pp. 85-87, 4 pages.

T Boden, "The grid enterprise—structuring the agile business of the future." BT Technology Journal vol. 22 No. 1 • Jan. 2004: pp. 107-117, 12 pages.

Tcherevik, Dmitri; Managing the Service-Oriented Architecture (SOA) and On-Demand Computing; copyright 2004 Computer Associates International, Inc., pp. 1-11.

Sven Graupner et al., "Management +=Grid", reference numeral HPL 2003-114, copyright Hewlett-Packard Company 2003, pp. 1-2, available at http://www.hpl.hp.com/techreports/2003/HPL-2003-114.html as of Nov. 14, 2004.

Baden, Mr Hughes and Steven, Dr Bird (2003) Grid-Enabling Natural Language Engineering by Stealth. In Proceedings HLT-NAACL03 Workshop on the Software Engineering and Architecture of Language Technology Systems, pp. 31-38, Edmonton, Canada, available from http://eprints.unimelb.edu.au/archive/00000491 as of May 3, 2004.

Zhu et al., "Scheduling Optimization for resource-intensive Web requests on server clusters", ACM Symposium on Parallel Algorithms and Architectures, 1999, p. 13-22.

Rumsewicz et al, "Preferential Load Balancing for Distributed Internet Servers", Cluster Computing and the Grid, Proceedings. First IEEE/ACM International Symposium, May 2001, p. 363-370.

Kim et al., "Request Rate adaptive dispatching architecture for scalable Internet Server", Cluster Computing, 2000, Proceedings. IEEE conference on Nov. 28-Dec. 1, 2000, p. 289-296.

Casalicchio et al, "Scalable Web Clusters with Static and Dynamic Contents", Cluster Computing, 2000, Proceedings. IEEE conference on Nov. 28-Dec. 1, 2000, p. 170-177.

Fox et al, "Cluster-based scalable network services", Oct. 1997 ACM SIGOPS Operating Systems Review, Proceedings of the 16.sup.th ACM symposium on operating systems principles, vol. 31, Issue 5, p. 78-91.

"Foster et al.; The Anatomy of the Grid, Enabling Scalable Virtual Organizations; available at www.globus.org/research/papers/anatomy.pdf as of Nov. 27, 2003, 25 pages.".

"Foster et al.; The Physiology of the Grid, An Open Grid Services Architecture for Distributed Systems Integration; available at www.globus/org/research/papers/ogsa.pdf as of Nov. 27, 2003, 31 pages.".

"Foster, Ian; What is the Grid? A Three Point Checklist; available at www-fp.mcs.anl.gov/-foster/Articles/WhatIsTheGrid.pdf as of Nov. 27, 2003, 4 pages.".

"Ferreira et al.; IBM Redpaper—Globus Toolkit 3.0 Quick Start; available at www.redbooks.ibm.com/redpapers/pdfs/redp369 as of Nov. 27, 2003, 36 pages.".

"IBM Grid Computing—What is Grid Computing; available at www-1.ibm.com/grid/about_grid/what_is.shtml as of Nov. 27, 2003, 1 page.".

"Berstis, Viktors; IBM Redpaper—Fundamentals of Grid Computing; available at www.redbooks.ibm.com/redpapers/pdfs/redp3613.pdf as of Nov. 27, 2003, 28 pages.".

"Jacob, Bart; IBM Grid Computing—Grid Computing: What are the key components?; available at www-106.ibm.com/developerworks/grid/library/gr-overview/ as of Nov. 27, 2003, 7 pages.".

Unger et al.; IBM Grid Computing—A Visual Tour of Open Grid Services Architecture; available at www-106.ibm.com/developerworks/grid/library/gr-visual/ as of Nov. 27, 2003, 9 pages.

Edited by Rajkumar Buyya; Grid Computing Info Centre: Frequently Asked Questions (FAQ); available at http://www.cs.mu.oz.auhraj/GridInfoware/ gridfaq.html as of Nov. 27, 2003, 3 pages.

Massie ML et al, "The Ganglia Distributed Monitoring System: Design, Implementation, and Experience" Parallel Computing Elsevier Netherlands, vol. 30, No. 7, Jul. 2004, pp. 817-840 24 pages.

Fenglian XU et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287, 7 pages.

Ian Foster and Carl Kesselman, "Grid2—Blueprint for a New Computing Infrastructure" 2004, Elsevier, San Francisco, CA, chapter 20, Instrumentation and Monitoring, pp. 319-343, 13 pages.

Smallen S et al, "The Inca Test Harness and Reporting Framework" Supercomputing 2004. Proceedings of the ACM/IEEE SC2004 Conference Pittsburgh, PA, Nov. 2004, p. 1-10, 10 pages.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358, 14 pages.

Hwa Min Lee, "A Fault Tolerance Service for QoS in Grid Computing", Lecture Notes in Computer Science, vol. 2659, Aug. 2003, pp. 286-296, 11 pages.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573, 8 pages.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316, 17 pages.

Geyer DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548, 8 pages.

Method of Providing On-Demand-Computing for Server Blades, IP.com Journal, IP.com Inc., West Henrietta, NY, US, Sep. 8, 2003, 1 page.

Kubicek, C, et al., "Dynamic Allocation of Servers to Jobs in a Grid Hosting Environment", BY Technology Journal, vol. 22, No. 3, Jul. 2004, pp. 251-260, 10 pages.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718, 4 pages.

Bodhuin et al, "Using Grid Technologies for Web-enabling Legacy Systems", Research Centre on Software Technology, available at http://www.bauhaus-stuttgart.de/sam/bodhuin.pdf as of at least Jun. 21, 2004.

IBM, "Process and method for IT energy optimization", Research Disclosure, Feb 2002, pp. 366-367, 2 pages.

Gillmor, Steve, "Ahead of the curve, Grid Will Hunting", InfoWorld; Feb. 25, 2002;24, p. 66, 1 page.

U.S. Appl. No. 10/756,134, filed Jan. 13, 2004, US Patent 7,406,691, Fellenstein et al, Notice of Allowance, mailing date Apr. 22, 2008, 12 pages.
U.S. Appl. No. 10/756,134, filed Jan. 13, 2004, US Patent 7406691, Fellenstein et al, Office Action, mailing date Oct. 31, 2007, 17 pages.
U.S. Appl. No. 10/757,270, filed Jan. 14, 2004, US Patent 7,464,159, Di Luoffo et al, Notice of Allowance, mailing date Aug. 4, 2008, 10 pages.
U.S. Appl. No. 10/757,270, filed Jan. 14, 2004, US Patent 7,464,159, Di Luoffo et al, Office Action, mailing date Jan. 24, 2008, 20 pages.
U.S. Appl. No. 10/757,282, filed Jan. 14, 2004, Di Luoffo et al, US Patent 7,552,437, Final Rejection, mailing date Jun. 28, 2008, 27 pages.
U.S. Appl. No. 10/757,282, filed Jan. 14, 2004, Di Luoffo et al, US Patent 7,552,437, Notice of Allowance, mailing date Feb. 24, 2009, 10 pages.
U.S. Appl. No. 10/757,282, filed Jan. 14, 2004, Di Luoffo et al, US Patent 7,552,437, Office Action, mailing date Dec. 26, 2007, 16 pages.
U.S. Appl. No. 10/756,138, filed Jan. 13, 2004, Fellenstein et al, US Patent 7562143, Final Office Action, mailing date Jun. 5, 2008, 31 pages.
U.S. Appl. No. 10/756,138, filed Jan. 13, 2004, Fellenstein et al, US Patent 7562143, Notice of Allowance, mailing date Feb. 6, 2009, 51 pages.
U.S. Appl. No. 10/756,138, filed Jan. 13, 2004, Fellenstein et al, US Patent 7562143, Office Action, mailing date Sep. 27, 2007, 49 pages.
U.S. Appl. No. 11/034,304, filed Jan. 12, 2005, US Patent 7,467,196, Di Luoffo et al, Notice of Allowance, mailing date Jul. 1, 2008, 6 pages.
U.S. Appl. No. 11/034,304, filed Jan. 12, 2005, US Patent 7,467,196, Di Luoffo et al, Office Action, mailing date Nov. 28, 2007, 26 pages.
U.S. Appl. No. 12/194,989, filed Aug. 20, 2008, Di Luoffo et al, US Patent 7664844, Notice of Allowance, mailing date Dec. 30, 2009, 7 pages.
U.S. Appl. No. 12/194,989, filed Aug. 20, 2008, Di Luoffo et al, US Patent 7664844, Office Action, mailing date Apr. 16, 2009, 5 pages.
U.S. Appl. No. 11/034,303, filed Jan. 12, 2008, Fellenstein et al, US Patent 7562035, Notice of Allowance, mailing date Mar. 9, 2009, 9 pages.
U.S. Appl. No. 11/034,303, filed Jan. 12, 2008, Fellenstein et al, US Patent 7562035, Office Action, mailing date Sep. 17, 2008, 35 pages.
U.S. Appl. No. 11/034,335, filed Jan. 12, 2005, Fellenstein et al, US Patent 7472079, Notice of Allowance, mailing date Aug. 7, 2008, 7 pages.
U.S. Appl. No. 11/034,335, filed Jan. 12, 2005, Fellenstein et al, US Patent 7472079, Office Action, mailing date Feb. 22, 2008, 29 pages.
U.S. Appl. No. 11/031,490, filed Jan. 6, 2005, US Patent 7761557, Fellenstein et al, Office Action, mailing date May 29, 2010, 66 pages.
U.S. Appl. No. 11/031,541, filed Jan. 6, 2005, US Patent 7533170, Fellenstein et al, Notice of Allowance, mailing date Oct. 31, 2008, 14 pages.
U.S. Appl. No. 11/031,541, filed Jan. 6, 2005, US Patent 7533170, Fellenstein et al, Office Action, mailing date May 20, 2008, 35 pages.
U.S. Appl. No. 11/031,543, filed Jan. 6, 2005, US Patent 7590623, Fellenstein et al, Office Action, mailing date Dec. 7, 2007, 17 pages.
U.S. Appl. No. 11/031,543, filed Jan. 6, 2005, US Patent 7590623, Fellenstein et al, Office Action, mailing date Jan. 27, 2009, 25 pages.
U.S. Appl. No. 11/031,543, filed Jan. 6, 2005, US Patent 7590623, Fellenstein et al, Notice of Allowance, mailing date May 11, 2009, 72 pages.
U.S. Appl. No. 11/031,543, filed Jan. 6, 2005, US Patent 7590623, Fellenstein et al, Office Action, mailing date Jun. 25, 2007, 41 pages.
U.S. Appl. No. 11/031,543, filed Jan. 6, 2005, US Patent 7590623, Fellenstein et al, Office Action, mailing date Jul. 10, 2008, 45 pages.
U.S. Appl. No. 11/031,403, filed Jan. 6, 2005, US Patent 7668741, Ernest et al, mailing date Oct. 24, 2008, 346 pages.
U.S. Appl. No. 11/031,427, filed Jan. 6, 2005, US Patent 7502850, Fellenstein et al, Notice of Allowance, mailing date Oct. 23, 2008, 14 pages.
U.S. Appl. No. 11/031,427, filed Jan. 6, 2005, US Patent 7502850, Fellenstein et al, Office Action, mailing date May. 12, 2008, 26 pages.
U.S. Appl. No. 10/865,270, filed Jun. 10, 2004, US Patent 7266547, Notice of Allowance, mailing date May 3, 2007, 9 pages.
U.S. Appl. No. 11/767,502, filed Jun. 23, 2007, US Publication 2007-0250489, Bao et al, Notice of Allowance, mailing date Oct. 22, 2010, 11 pages.
U.S. Appl. No. 11/031,426, filed Jan. 6, 2005, US Patent 7793308, Gusler et al, Notice of Allowance, mailing date Apr. 29, 2010, 26 pages.
U.S. Appl. No. 10/865,270, filed Jun. 10, 2004, US Patent 7266547, Bao et al, Office Action, mailing date Nov. 7, 2006, 20 pages.
U.S. Appl. No. 11/034,305, filed Jan. 12, 2005, US Patent 7571120, Fellenstein et al, Office Action, mailing date Oct. 2, 2008, 33 pages.
U.S. Appl. No. 11/034,305, filed Jan. 12, 2005, US Patent 7571120, Fellenstein et al, Notice of Allowance, mailing date Mar. 24, 2009, 10 pages.
U.S. Appl. No. 12/491,172, filed Jun. 24, 2009, Fellenstein et al, Notice of Allowance, mailing date Jul. 28, 2010, 13 pages.
U.S. Appl. No. 11/031,489, filed Jan. 6, 2005, US Publication 20060149652, Fellenstein et al, Final Office Action, mailing date Nov. 26, 2010, 78 pages.
U.S. Appl. No. 12/491,172, filed Jun. 24, 2009, Fellenstein et al, Notice of Allowance, mailing date Nov. 19, 2010, 29 pages.
U.S. Appl. No. 12/491,172, filed Jun. 24, 2009, Fellenstein et al, Notice of Allowance, mailing date Dec. 21, 2010, 10 pages.
U.S. Appl. No. 12/211,243, filed Sep. 16, 2008, US Patent 7,734,679, Di Luoffo et al, Office Action, mailing date Jun. 12, 2009, 18 pages.
Japanese Patent Office Action, Information Material for IDS, dated Oct. 27, 2010, 2 pages.
Fellenstein et al, Notice of Allowance, U.S. Appl. No. 12/480,939, filed Jun. 9, 2009, mailing date Mar. 3, 2011, 55 pages.
Final Office Action, U.S. Appl. No. 12/435,370, filed May 4, 2009, Craig Fellenstein, Mailing date Mar. 22, 2011, 43 pages.
Joseph, Joshy and Fellenstein, Craig, "Grid Computing", IBM Press, Dec. 30, 2003, ISBN-10: 0-13-145660-1, 387 pages in print edition, also available online from <http://my.safaribooksonline.com/book/software-engineering-and-development/grid-computing/0131456601>. See pp. 148-152.
U.S. Appl. No. 12/470,225, filed May 21, 2009, Vincent Valentino Di Luoffo, Non-Final Office Action, mailed May 12, 2011, 64 pages.
Notice of Allowance, U.S. Appl. No. 12/470,225, filed May 21, 2009, Vincent Valentino Di Luoffo, mailing date Nov. 4, 2011, 26 pages.
Office Action, U.S. Appl. No. 12/535,404, filed Aug. 4, 2009, Craig William Fellenstein, mailing date Nov. 2, 2011, 151 pages.
Rolia, Jerry et al, "Service Centric Computing—Next Generation Internet Computing", 2002, Springer-Verlag Berlin Heidelberg, pp. 463-479.
Belloum, Adam et al, "VLAM-G: a grid-based virtual laboratory", 2002, Future Generation Computer Systems 19, Elsevier Science B.V., pp. 209-217.
Min, D. and Mutka, M., "Efficient Job Scheduling in a Mesh Multicomputer Without Discrimination Against Large Jobs", 1995, IEEE., pp. 52-59.
Office Action, U.S. Appl. No. 12/535,404, filed Aug. 4, 2009, Craig William Fellenstein, mailing date May 25, 2012, 47 pages.
Notice of Allowance, U.S. Appl. No. 12/435,370, filed May 4, 2009, In Re Craig Fellenstein, mailing date May 11, 2012, 130 pages.
Krauter et al, A Taxonomy and Survey of Grid Resource Management Systems for Distributed Computing, Sep. 17, 2001, John Wiley & Sons, pp. 1-32.
He et al. "Hybrid performance-based workload management for multiclusters and grids", 2004, IET Journals and Magazines, vol. 8, issue 4, pp. 224-231.
He et al. "Dynamic scheduling of parallel jobs with QoS Demands in multiclusters and grids", 2004, Grid Computing, 2004. Proceedings. IEEE/ACM International Workshop, pp. 402-409.
Cao, J., "Self-Organizing agents for grid load balancing", 2004, Grid Computing, 2004. Proceedings. Fifth IEEE/ACM International Workshop, pp. 388-395.
Notice of Allowance, mailing date Jul. 19, 2012, U.S. Appl. No. 12/480,939, filed Jun. 9, 2009, In re Fellenstein, 32 pages.

DECISION LOGIC CACHE TABLE 1000

| STATE | JOB PRIORITY | DECISION CODE | ACTION EXECUTED |
|---|---|---|---|
| 000 | 1 | 001 | TAKE NO ACTION |
| 000 | 2 | 002 | TAKE NO ACTION |
| 000 | 3 | 003 | TAKE NO ACTION |
| 000 | 4 | 004 | TAKE NO ACTION |
| 100 | 1 | 101 | ALLOW UNLIMITED CPU's |
| 100 | 2 | 102 | ALLOW 10 CPU's |
| 100 | 3 | 103 | ALLOW 3 CPU's |
| 100 | 4 | 104 | ALLOW NO ADDITIONAL CPU's |

MINIMIZING COMPLEX DECISIONS TO ALLOCATE ADDITIONAL RESOURCES TO A JOB SUBMITTED TO A GRID ENVIRONMENT

CROSS-REFERENCE TO RELATED APPLICATIONS

This application is a continuation of commonly assigned U.S. patent application Ser. No. 10/756,134, now U.S. Pat. No. 7,406,691 filed Jan. 13, 2004, which is hereby incorporated herein by reference.

BACKGROUND OF THE INVENTION

1. Technical Field

The present invention relates in general to improved performance in distributed systems and in particular to a method for minimizing complex decision making when allocating additional resources to a job submitted to a first selection of resources in a grid environment. Still more particularly, the present invention relates to storing previous decisions to allocate additional resources in a grid environment according to characteristics of the jobs for which decisions were made, such that the stored decisions can be reused for subsequent jobs with similar characteristics to minimize complex decisions when allocating additional resources in a grid environment.

2. Description of the Related Art

Ever since the first connection was made between two computer systems, new ways of transferring data, resources, and other information between two computer systems via a connection continue to develop. In a typical network architecture, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources from geographically distributed systems operated by different organizations with differing policies and management systems is organized to handle a job request.

In addition to decentralizing resources available in a grid environment to improve efficiency of network transactions, capacity on demand resources are gaining more presence. An on demand resource is one that is accessible to a system, but is operational only when a fee is paid or an electronic key to open the resource is provided.

An important attribute of a grid environment that distinguishes a grid environment from merely that of another management system is quality of service maintained across multiple diverse sets of resources. A grid environment does more than just provide resources; a grid environment provides resources with a particular level of service including response time, throughput, availability, security, and the co-allocation of multiple resource types to meet complex user demands. A limitation of current grid technology, however, is that maintenance of agreed to quality of service from grid resources requires human intervention. For example, human intervention is relied on in a grid environment to decide when to allocate and deallocate resources to reach specified performance levels. Further, manual intervention is relied on in a grid environment to suspend low priority jobs or move jobs to other selections of resources within the grid environment. Manual intervention is limiting on the efficiency and expansion of grid environments because it is by nature inefficient and prone to error.

As a result of developing grid environments and on demand resources, a single system may have access to multiple discrete sets of resources. For example, first, a system typically accesses those components within the system that provide a primary set of local resources. Next, a system may access resources from other systems within a local or enterprise network. Further, a system may access and activate capacity on demand resources either from within the system or from a system accessible via a network. Finally, a system may access grid resources accessible through participation in a grid environment.

With the availability of multiple sets of discrete resources, an additional limitation of current grid technology is that human intervention is required to manage the flow between each of these discrete sets of resources to determine whether use of grid resources is required. Further, human intervention is required to determine whether to activate capacity on demand resources first or go directly to grid resources. Thus, a disadvantage of current grid technology is that when a job request is executing within a set of resources that become unable to handle performance requirements for the job, human intervention is required to decide whether to schedule the job into a grid environment or other set of resources. Given the quality of service requirements within a grid environment, it would first be advantageous to make decisions about the flow of a job through discrete sets of resources without requiring human intervention.

A common feature in network computing is that the same type of job may be requested from the same client system or multiple client systems within a short period of time. If the first time the job is received a complex decision has to be made to manage the flow of the job between discrete sets of resources, it would be advantageous to reuse that complex decision for other similar jobs. Therefore, in view of the foregoing, it would be advantageous to provide a method, system, and program for improving the efficiency of the use of a hierarchy of resources in a grid environment by storing complex decisions about the flow of a job such that the complex decisions may be reused for future jobs of the same type.

SUMMARY OF THE INVENTION

In view of the foregoing, the invention provides for minimizing complex decision making when allocating additional resources to a job submitted to a first selection of resources in a grid environment and to storing previous decisions to allocate additional resources in a grid environment according to characteristics of the jobs for which decisions were made, such that the stored decisions can be reused for subsequent jobs with similar characteristics to minimize complex decisions when allocating additional resources in a grid environment.

In one embodiment, a computer system for minimizing complex decision making when allocating additional resources to a job submitted in a grid environment includes one or more processors and one or more computer-readable tangible storage devices. The computer system includes program instructions, stored on at least one of the one or more storage devices for execution by at least one of said one or more processors, for receiving, by a grid management system, a plurality of separate jobs from a plurality of client systems over a network. The computer system includes program instructions, stored on at least one of the one or more storage devices for execution by at least one of said one or more processors, for managing, by said grid management system, distribution of each of said plurality of separate jobs to a separate selection of at least one resource of a grid environment comprising a plurality of computing stems each comprising at least one of said at least resource and communicatively connected over a network through said grid management system to share each said at least one resource through at least one web service layer atop at least one grid service layer implemented within an open grid services architecture. The computer system includes program instructions, stored on at least one of the one or more storage devices for execution by at least one of said one or more processors, responsive to said grid management system distributing each of said plurality of separate jobs to said separate selection of said at least one resource, for triggering, by said at least one grid service layer, at least one resource monitor to monitor a performance of said separate selection of said at least one resource in handling each of said plurality of separate jobs to meet a separate performance agreement specified for each of said plurality of separate jobs and for triggering, by said at least one grid service layer, at least one decision controller from said at least one grid service layer to determine whether to allocate additional resources to each of said plurality of separate jobs to meet at least one said separate performance agreement specified for at least one of said plurality of separate jobs. The computer system includes program instructions, stored on at least one of the one or more storage devices for execution by at least one of said one or more processors, responsive to said at least one decision controller deciding to allocate additional resources to at least one particular job from among said plurality of separate jobs, for storing, in a memory medium within said grid management system, a record of at least one decision to allocate said additional resources from among said at least one resource to said at least one particular job, wherein said record of said at least one decision is specified by an amount of said at least one resource available for allocation and at least one characteristic of said at least one particular job, wherein said at least one characteristic of said at least one particular job comprises a system state detected by said at least one resource monitor of a particular separate selection of said at least one resource to which said at least one particular job was submitted and a particular priority of said at least one particular job to receive said additional resources from among said at least one resource. The computer system includes program instructions, stored on at least one of the one or more storage devices for execution by at least one of said one or more processors, responsive to said at least one decision controller determining whether to allocate said additional resources to a currently submitted job from among said plurality of separate jobs, for comparing, by said grid management system, at least one characteristic of said currently submitted job from among said plurality of separate jobs qualifying for said additional resources from said at least one resource of said grid environment with said at least one characteristic of said at least one particular job in said record in said memory medium, wherein said at least one characteristic of said currently submitted job comprises a system state of a current separate selection of said at least one resource to which said currently submitted job was submitted and a current priority of said currently submitted job to receive said additional resources from among said at least one resource. The computer system includes program instructions, stored on at least one of the one or more storage devices for execution by at least one of said one or more processors, responsive to said at least one characteristic of said currently submitted job matching said at least one characteristic of said at least one particular job in said record, for applying, by said grid management system, said record of said at least one decision associated with said matching job characteristics to control allocation of said additional resources for said currently submitted job, such that complex decision making for allocation of additional resources is minimized by reusing previously stored decisions to allocate additional resources.

In another embodiment, a computer program product for minimizing complex decision making when allocating additional resources to a job submitted in a grid environment comprises one or more computer-readable tangible storage devices. The computer program product includes program instructions, stored on at least one of the one or more storage devices, to receive a plurality of separate jobs from a plurality of client systems over a network at a grid management system. The computer program product includes program instructions, stored on at least one of the one or more storage devices, to manage distribution from said grid management system of each of said plurality of separate jobs to a separate selection of at least one resource of a grid environment comprising a plurality of computing systems each comprising at least one of said at least resource and communicatively connected over a network through said grid management system to share each said at least one resource through at least one web service layer atop at least one grid service layer implemented within an open grid services architecture. The computer program product includes program instructions, stored on at least one of the one or more storage devices, responsive to said grid management system distributing each of said plurality of separate jobs to said separate selection of said at least one resource, to trigger at least one resource monitor from said at least one grid service layer to monitor a performance of said separate selection of said at least one resource in handling each of said plurality of separate jobs to meet a separate performance agreement specified for each of said plurality of separate jobs and to trigger at least one decision controller from said at least one grid service layer to determine whether to allocate additional resources to each of said plurality of separate jobs to meet at least one said separate performance agreement specified for at least one of said plurality of separate jobs. The computer program product includes program instructions, stored on at least one of the one or more storage devices, responsive to said at least one decision controller deciding to allocate said additional resources to at least one particular job from among said plurality of separate jobs, to store, in at least one memory medium of said grid management system, a record of at least one decision to allocate said additional resources from among said at least one resource to said at least one particular job, wherein said record of said at least one decision is specified by an amount of said at least one resource available for allocation and at least one characteristic of said at least one particular job, wherein said at least one characteristic of said at least one particular job comprises a system state detected by said at least one resource monitor of a particular separate selection of said at least one resource to which said at least one particular job was submitted and a particular priority of said at least one particular job to receive said additional resources from among said at least one resource. The computer program product includes program instructions, stored on at least one of the one or more storage devices, responsive to said at least one decision controller determining whether to allocate said additional resources to a currently submitted job from among said plurality of separate jobs, to compare, by said grid management system, at least one characteristic of said currently submitted job from among said plurality of separate jobs qualifying for said additional resources from said at least one resource of said grid environment with said at least one characteristic of said at least one particular job in said record in said at least one memory medium, wherein said at least one characteristic of said currently submitted job comprises a system state of a current separate selection of said at least one resource to which said currently submitted job was submitted and a current priority of said currently submitted job to receive said additional resources from among said at least one resource. The computer program product includes program instructions, stored on at least one of the one or more storage devices, responsive to said at least one characteristic of said currently submitted job matching said at least one characteristic of said at least one particular job in said record, to apply by said grid management system said record of said at least one decision associated with said matching job characteristics to control allocation of additional resources for said currently submitted job, such that complex decision making for allocation of said additional resources is minimized by reusing previously stored decisions to allocate additional resources.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
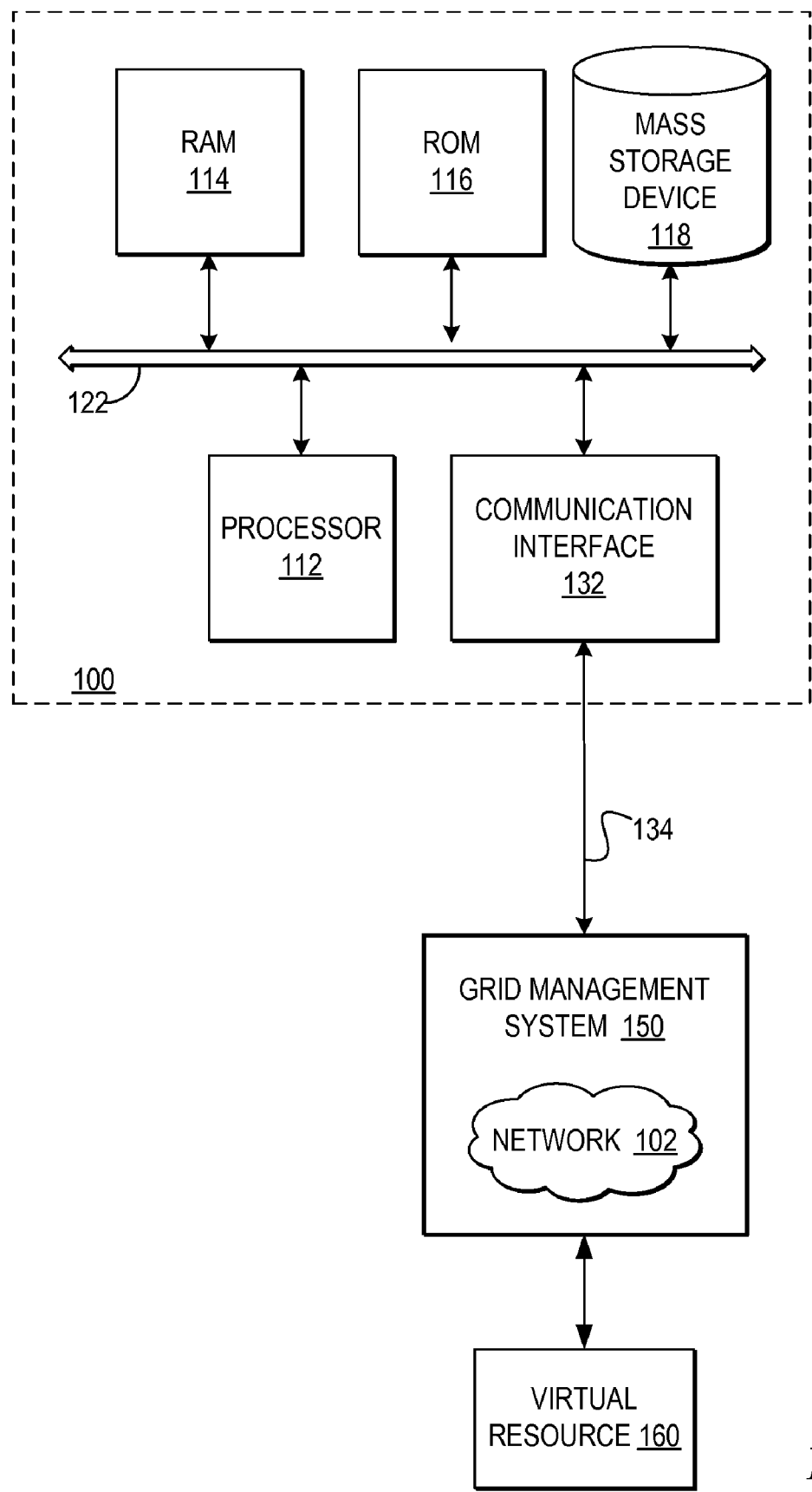
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 7A-7B, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein refers to any data storage medium that participates in providing instructions to processor 112 or other components of computer system 100 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other data storage medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114.

Moreover, the present invention may be downloaded as a computer program product, wherein the program instructions may be transferred from a remote virtual resource, such as a virtual resource 160, to requesting computer system 100 via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided within a grid environment 150. Grid environment 150 may be part of multiple types of networks, including a peer-to-peer network, or may be part of a single computer system, such as computer system 100.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
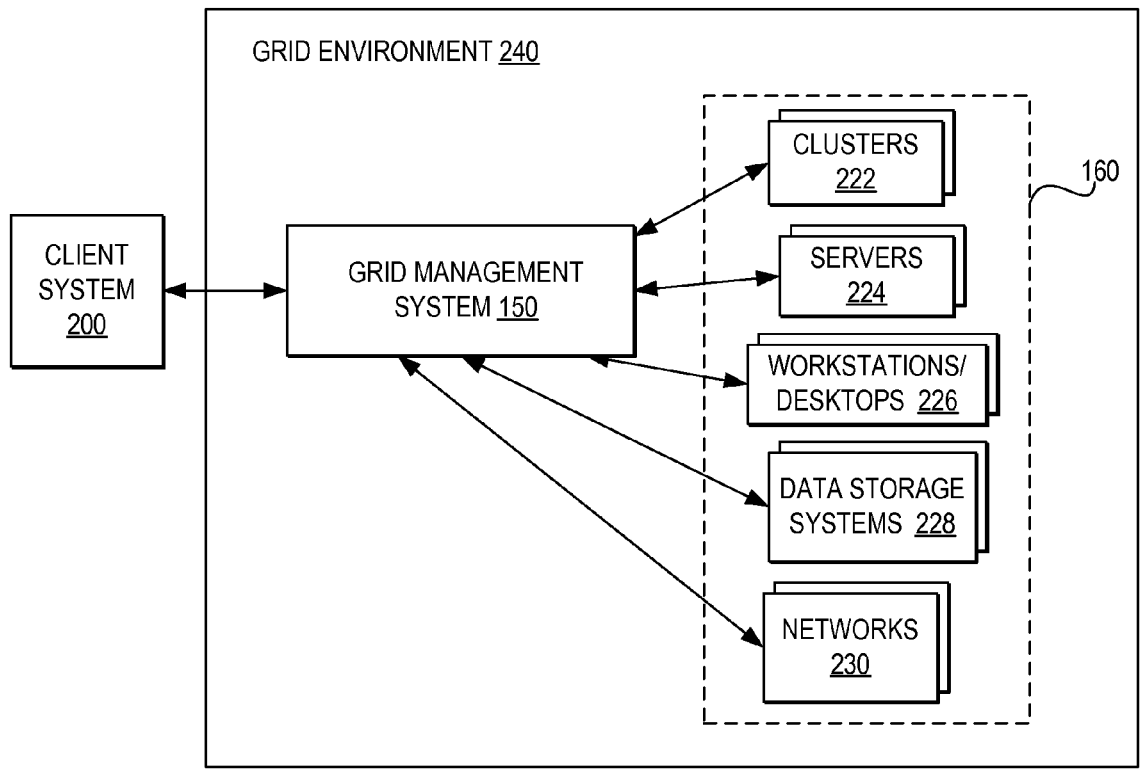
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

Grid environment 240, as managed by grid management system 150, may provide a single type of service or multiple types of services. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

Figure 3:
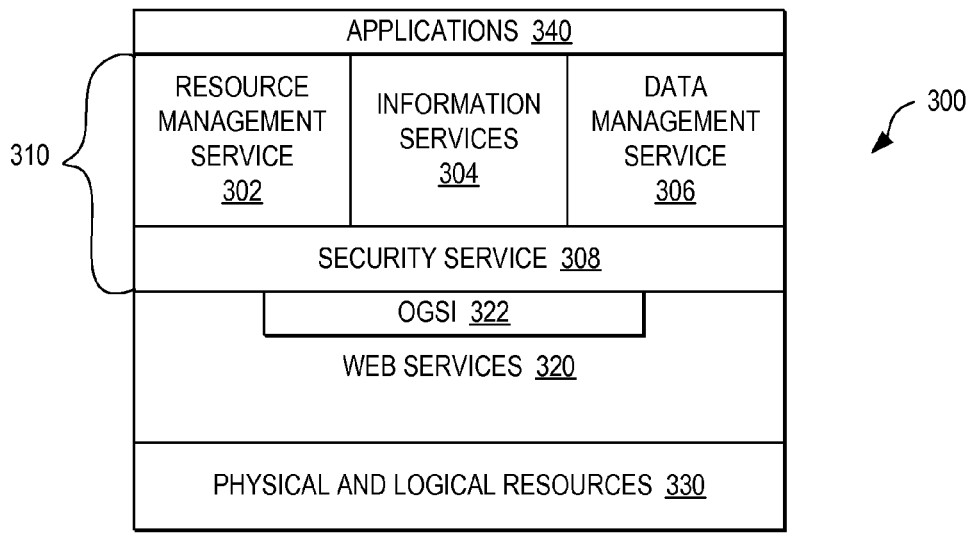
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
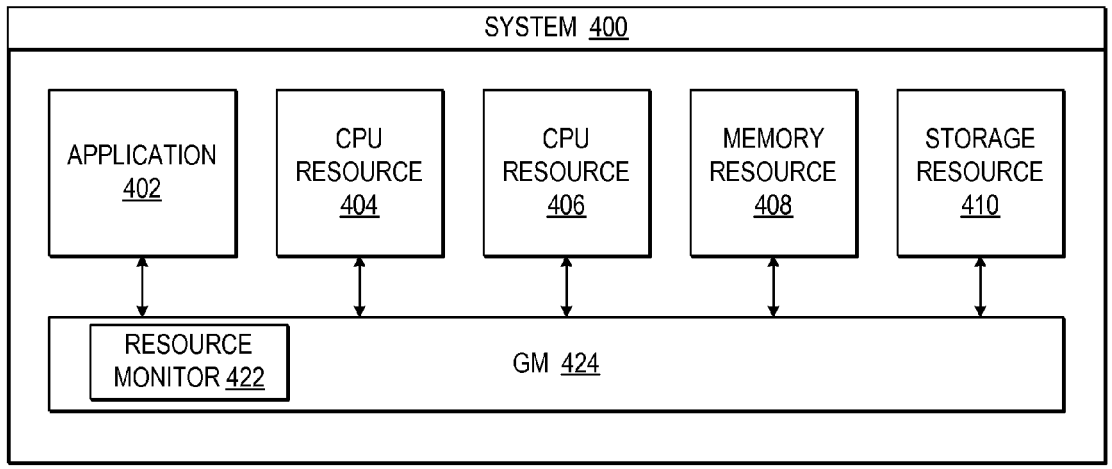
FIG. 4 is a block diagram depicting a system operating within the grid environment from the perspective of the grid management system is depicted in accordance with the method, system, and program of the present invention.

With reference now to FIG. 4, a block diagram of a system operating within the grid environment from the perspective of the grid management system is depicted in accordance with the method, system, and program of the present invention. As illustrated in FIG. 1, a computer system includes many hardware components. As part of a grid environment, however, these hardware components are viewed as resources. For example, a system 400 includes an application resource 402, two CPU resources 404 and 406, a memory resource 408, and a storage resource 410. The resources in system 400 are typical of the types of resources when viewed within the grid environment, however, in an alternate embodiment, other types of resources may be provided. Further, the resources in system 400 may be physically located within a single computer system or distributed across multiple computer systems connected by a network, for example As part of the grid management system described in FIG. 2, a grid manager and router (GM) 424 provides the interface between the resources of system 400 and client systems sending requests.

In particular, a resource monitor 422 within GM 424 monitors the working status of each of the resources available in system 400. GM 424 preferably sends status reports to other grid managers and routers within the grid environment to indicate the availability of the resources in system 400. Additionally, status reports may describe the computer hardware, operating system, and resources of system 400. Status reports may be generated, for example, when system 400 joins or leaves the grid environment, when a threshold is detected, at predetermined time intervals, and on specific predetermined events, including, but not limited to a hardware fault or a portion of a service failing.

Figure 5:
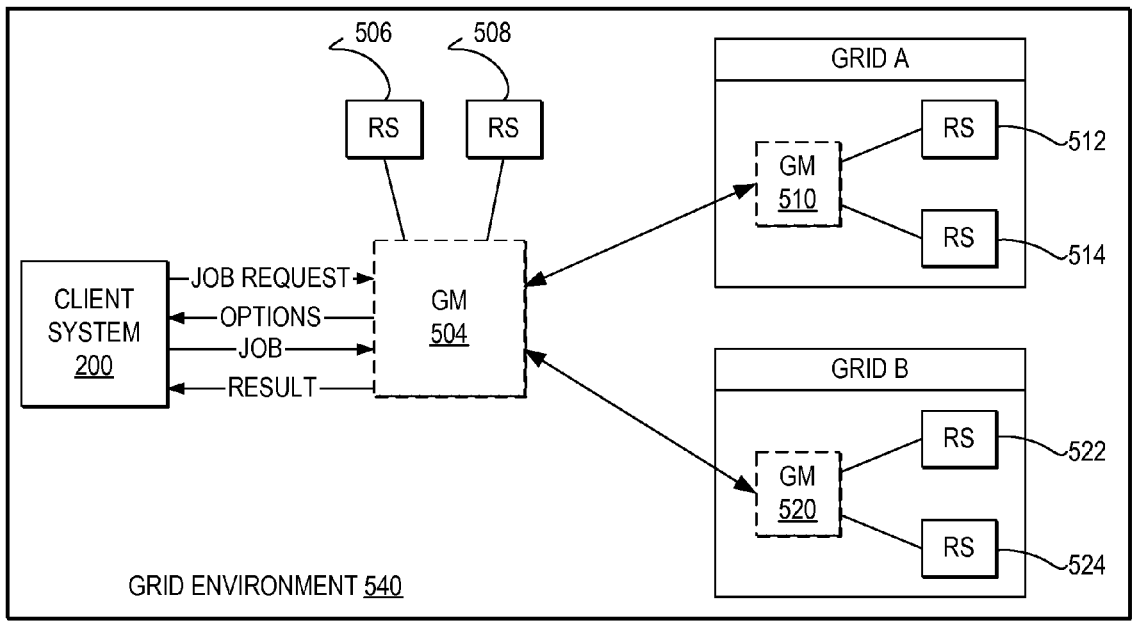
FIG. 5 is an illustrative representation depicting one embodiment of the logical infrastructure of a grid environment in which the present invention may be implemented.

Referring now to FIG. 5, an illustrative representation depicts one embodiment of the logical infrastructure of a grid environment in which the present invention may be implemented. While FIG. 2 depicts an example of general components of a grid environment, in the present figure, an example of how the general components are viewed logically within a grid environment is illustrated in a grid environment 540. In particular, the grid management system functions are logically dispersed into multiple GMs, such as GM 504, GM 510, and GM 520. Further, the virtual resource is logically dispersed into multiple resources (RSs), such as RS 506, RS 508, RS 512, RS 514, RS 522, and RS 524. It is important to note that a resource may not be a direct representation of a physical resource, but rather a logical representation of one or more physical resources and or groups of physical resources.

In the example, client system 200 sends a job request to GM 504. GM 504 searches for resources available to handle the job specified in the job request. In particular, GM 504 checks whether RS 506 and RS 508 can handle the job specified in the job request and may send queries to other GMs, such as GM 510 or GM 520. GMs 510 and 520 return reports on the availability of resources to handle the job request.

For purposes of illustrations, RS 506 and RS 508 are considered local resources or resources within the same discrete set of resources to which jobs from client system 200 are submitted. In the examples following, when RS 506 and 508 are not meeting performance requirements for a job from client system 200, then additional resources may be allocated including other resources within the same discrete set of resources, capacity on demand resources, resources from internal grids and finally resources from external grids.

More specifically, in the example, GM 510, RS 512, and RS 514 are part of one grid infrastructure "grid A" operated by a first business that provides a first specified number of grid services for a first specified price. Then, GM 520, RS 522, and RS 524 are part of another grid infrastructure "grid B" operated by a second business that provides a second specified number of grid services for a second specified price. When GM 504 sends the job request to GM 510 and GM 520, the each GM preferably reports whether the job request can be handled and a price for handling the request. In relation to client system 200, grids A and B may be internal grids operating within the same enterprise system as client system 200 or external grids.

After receiving reports on the availability of resources, GM 504 collects the options for handling the job and returns the options to client system 200. Client system 200 may then decide to select a preferred option and send the job to have handled according to the selected option. GM 504 manages the return of the results of the job to client system 200.

The resources utilized in the option selected by client system 200 form a virtual organization for handling the job. For example, if client system 200 selects an option to handle the job based on the option returned from GM 510, then a virtual organization may be formed to process the job which would include GM 504, GM 510, RS 512, and RS 514. According to an advantage of the present invention, any of the GMs may also automatically allocate additional resources to a job submitted to a first selection of resources. In particular, if the resources handling a job do not meet performance specifications, then additional resources may be allocated to the virtual organization of resources formed to process the job. These performance specifications may include quality of service specifications compiled from service level objects and agreements.

Figures 6, 10:
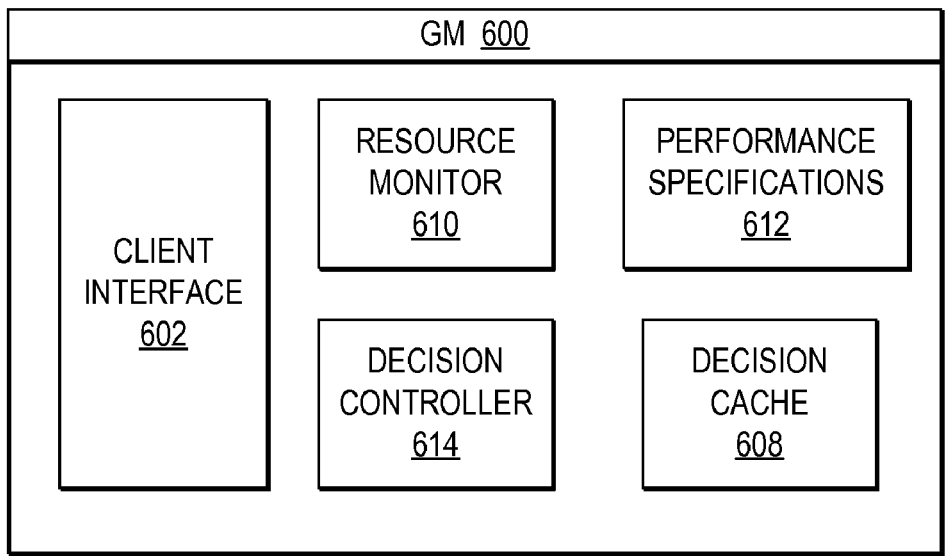
FIG. 6 is a block diagram depicting a grid manager or router (GM) including a decision cache that may implement the present invention.
FIG. 10 depicts an example of a decision logic cache table in accordance with the method, system, and program of the present invention.

With reference now to FIG. 6, there is depicted a block diagram of a grid manager or router (GM) including a decision cache that may implement the present invention. As depicted, a GM 600 includes a client interface 602 for receiving jobs. Client interface 602 assigns a unique identifier to each job and holds jobs for processing by GM 600. In particular, client interface 602 may require authentication of the client sending the job request before the job is assigned a job identifier and transferred to decision controller 614.

Once a job request is received at GM 600, GM 600 preferably determines which resources are available for the job, submits the job to a selection of resources, and monitors the resource availability of multiple levels of resources accessible to GM 600 to determine current usage levels. First, a resource monitor 610 preferably monitors the resource availability of multiple levels of resources accessible to GM 610 to determine which are able to handle the job request. Then, a decision controller 614 preferably determines resource options to meet performance specification 612 designated for the job request or for the requesting client. In particular, decision controller 614 may be required to make complex decisions with respect to job resource options for a particular job request to maintain performance service level agreements with the client sending the job request. For example, decision controller 614 may decide when to allocate additional resources to maintain performance service level agreements specified in performance specification 612 for the job request. Advantageously, decision controller 614 stores these decisions in decision cache 608 according to identifiers such as system state and job priority.

Once a decision is stored in decision cache 608, decision controller 614 may reuse the decision. Decision cache 608 may implement a data storage format, such as a table, for storage of decisions with characteristics of the job for which the decision was made. Preferably, data is stored in decision cache 608 so that decision controller 614 can compare characteristics of new job requests with stored characteristics of previous job requests and reuse decisions made for previous job requests with the same or similar characteristics. For example, the system state and job priority are characteristics that may be stored with a decision and subsequently matched with other jobs. The data storage stored in decision cache 608 may advantageously be stored in secondary locations and may be stored in relational or other media based application so that the data is not lost in the event of a power failure.

Figure 7A:
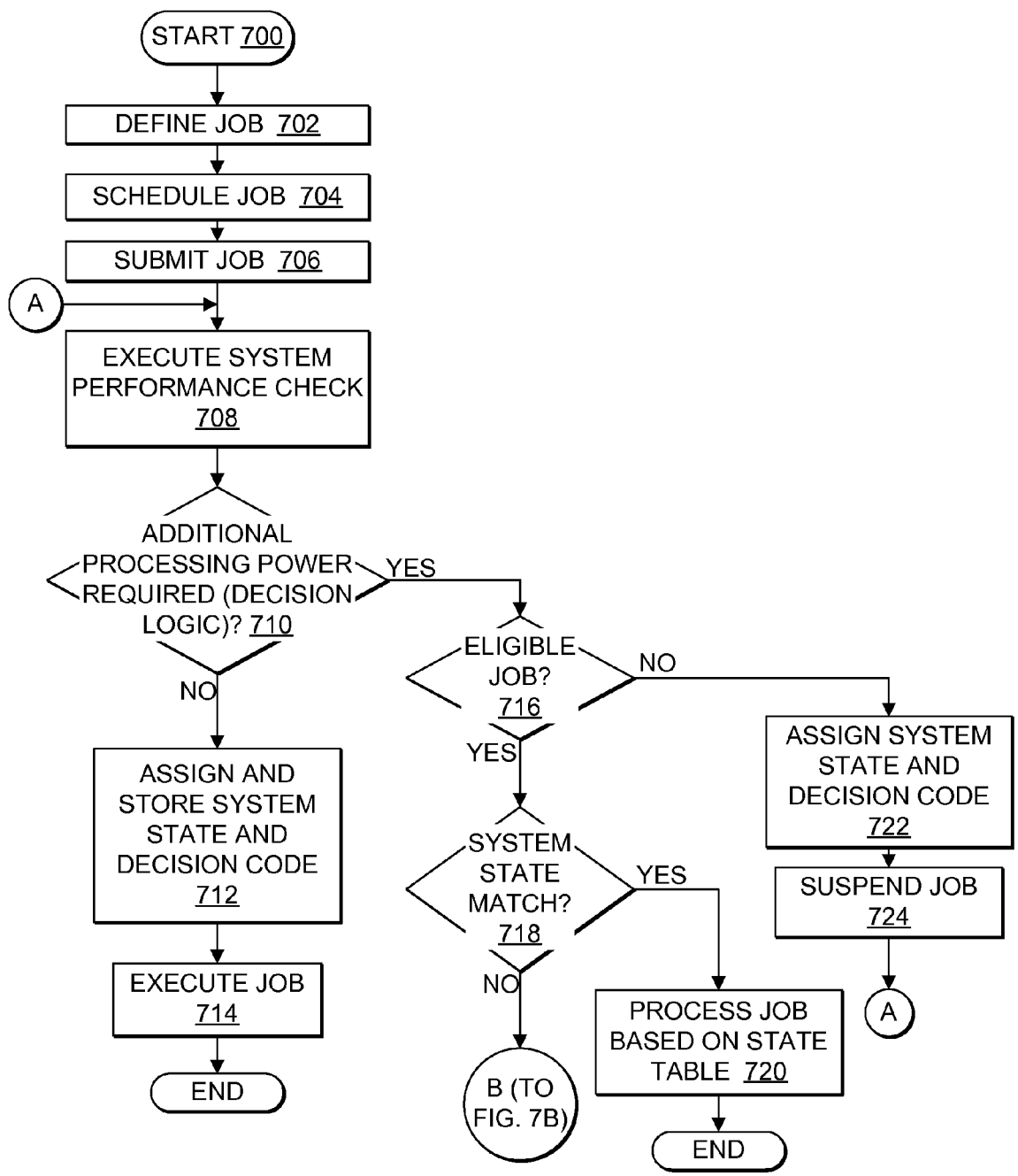
FIGS. 7A-7B depict a high level logic flowchart of a process and program for enhancing grid job submission performance via hierarchical decision caching.
Figure 7B:
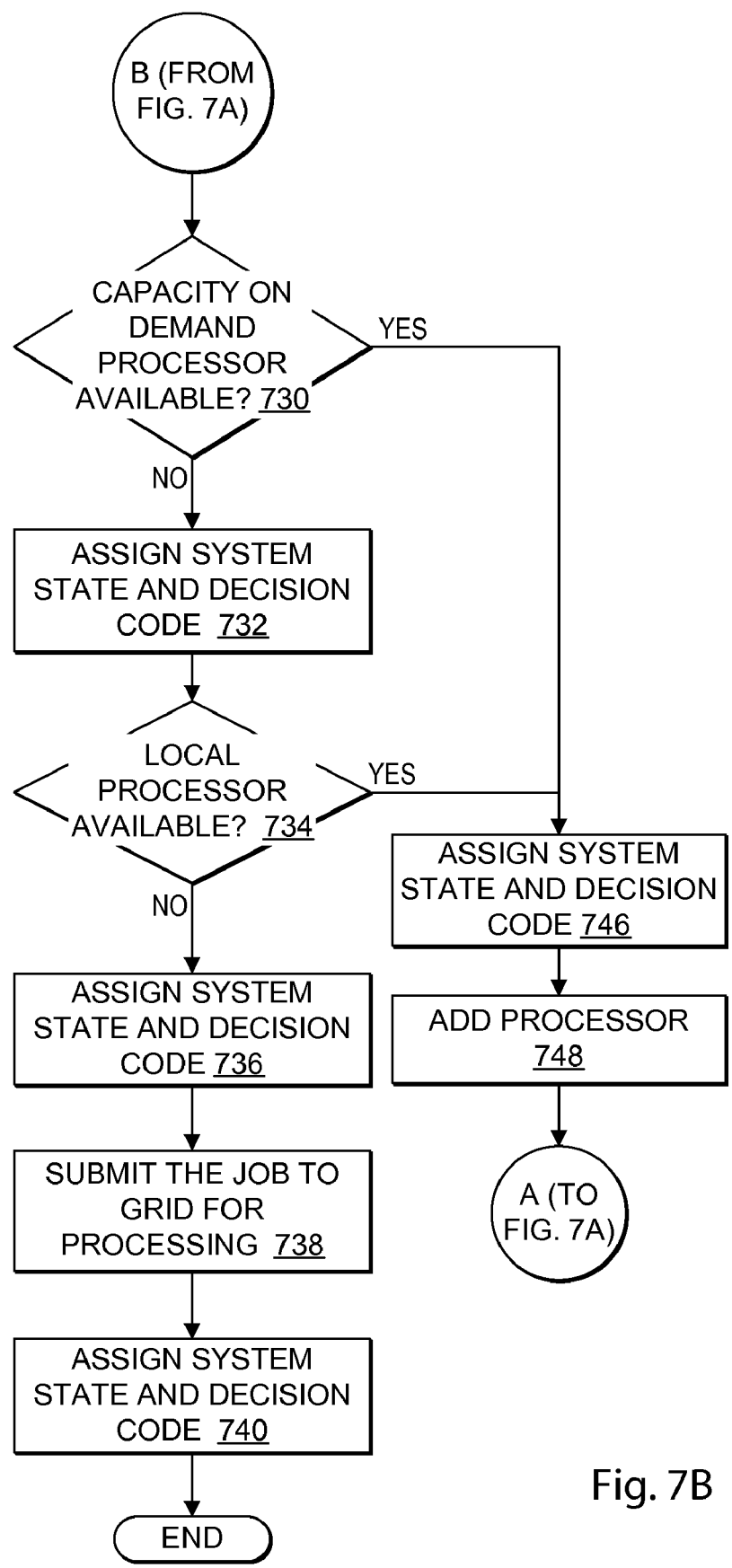

Referring now to FIGS. 7A-7b, there is illustrated a high level logic flowchart of a process and program for enhancing grid job submission performance via hierarchical decision caching. The following process may be performed through a grid manager and router or other component of the grid management system. In particular, in the logic flowchart, complex decisions are made multiple times as a job flows through the layers of resources, and ultimately to a selection of resources able to execute the job and meet performance specifications. Advantageously, the decisions made for a job request are stored as a system state and decision code in a decision cache so that even if a second similar job is executing back-to-back with the first, the second similar job is more efficiently processed using the predetermined decisions in the decision cache.

As depicted, the process starts at block 700 and thereafter proceeds to block 702. Block 702 depicts defining a job. Next, block 704 illustrates scheduling the job. In particular, a job may be scheduled according to job requirements and job priority. In the example, the job is scheduled for use of processing resources and thus the steps of the process reflect those taken for deciding whether additional processing resources are required for the job and if so, acquiring the additional processing resources. It will be understood that in alternate embodiments, a job may be scheduled for use of other types of resources including, but not limited to, memory, disk space, I/O subsystems, and networks. Thus, in alternate embodiments, decisions may be made about acquiring other types of resources. Thereafter, block 706 depicts submitting the job to a selection of resources, and the process passes to block 708. In particular, considerations for job submission may include, but are not limited to, operating system type, kernel width, application threading, CPU requirements, memory requirements, and other factors. In one example of submitting the job into the local client environment, a determination is made whether the job is single threaded or multi-threaded. If the job is single threaded, then the job is queued at one processor. If the job is multi-threaded, then the job is queued at multiple processors.

Block 708 depicts executing a system performance check. The resource monitor, for example, may execute the system performance check that surveys the performance of available resources. In particular, many factors or a combination of factors may be used to determine system performance including, but not limited to, the depth of the processor(s) run queue, the amount of memory available, the amount of disk space free, and the network bandwidth available. Multiple types of performance monitoring tools capable of providing performance related information may be implemented by the resource monitor including, but not limited to, International Business Machine Corporation (IBM) Performance Toolbox or invoking an operating system command, such as the "vmstat" command in the UNIX operating system.

Next, block 710 illustrates a determination whether additional processing power is required to process the current job. Alternatively, a determination may be made whether other additional resources are required for the job. As will be further described in FIG. 8, this step requires a determination whether the current resource saturation of the resources handling the job, as monitored by the system performance check, exceeds predefined thresholds for resource saturation for the job or the client system. In the example, if system performance is acceptable, then no additional processing power is required and the process passes to block 712. If additional processing power is required, then the process passes to block 716.

First, if no additional processing power is required at block 710, then block 712 illustrates assigning a system state and decision code to the job indicating that no additional processing power was added. In particular, when a system state and decision code are assigned to a job, then the decision, the system state, the job priority and the assigned decision code are cached in the decision cache. The system state indicates the resource saturation level of the available grid resources when the decision was made. The decision code indicates the decision made for a particular priority of job for a particular system state. Next, block 714 depicts executing the job by sending the job to a selection of available resources, and the process ends.

Alternatively, if additional processing power is required at block 710, then block 716 depicts a determination whether the job is eligible for additional resources based on the priority of the job or other required qualification. In particular, the saturation levels of the resources to which the job is submitted may reach levels that indicate additional processing power is required for processing the job. Not every job, however, will qualify for the addition of processing power. For example, jobs which are non-interactive and thus do not require specific performance may not be eligible for access to additional system resources. Further, if certain jobs begin to affect the performance of higher priority jobs, the job priority of a job may be reduced using tools such as a UNIX "nice" command. In comparison, some jobs may be designated as always valuable and granted broad access to additional resources. If the job is not qualified, then the process passes to block 722. Block 722 illustrates assigning a system state and decision code indicating that no additional processing power was added. Next, block 724 depicts suspending the job or continuing to execute the job on the original selection of resources, and the process returns to block 708. Alternatively, if at block 716 the job is qualified, then the process passes to block 718.

Block 718 depicts a determination whether the current system state matches a system state in the decision cache according to the job priority. In particular, this is a determination whether a decision was previously cached for this type of job operating in the same system performance conditions. If the system state matches, then the process passes to block 720. Block 720 depicts processing the job based on the previously cached decision for the system state and job priority, and the process ends. In processing the job based on the previously cached decision in the state table, decisions to allocate additional resources are made more efficient. Alternatively, if at block 718 the system state does not match, then the process passes to block 730 of FIG. 7B.

Block 730 illustrates a determination whether capacity on demand processing is available. If capacity on demand processing is available, then the process passes to block 746. Block 746 depicts assigning a system state and decision code indicating that a capacity on demand processor was added. Next, block 748 depicts adding the on demand processor, and the process returns to block 708 of FIG. 7A. Alternatively, if at block 730 capacity on demand processing is not available, then the process passes to block 732. Block 732 depicts assigning a system state and decision code indicating that a capacity on demand processor was not added, and the process passes to block 734.

Block 734 depicts a determination whether a local processor is available. If a local processor is available, then the process passes to block 746, where a system state and decision code are assigned indicating that a local processor was added. If a local processor is not available, then the process passes to block 736. Block 736 illustrates assigning a system state and decision code indicating that a local processor was not added. Next, block 738 depicts submitting the job to the grid for processing. In particular, the grid may be an internal or external grid of systems that provide a particular resource or service. Then, block 740 illustrates assigning a system state and decision code indicating a grid resource was added, and the process ends. In particular, although not depicted, after the job is submitted to the grid for processing, the steps of the process may be repeated locally within a grid to determine which resources are necessary within a grid unit. Further, a system state and decision code may be assigned and stored locally within a grid unit.

Figures 8, 9:
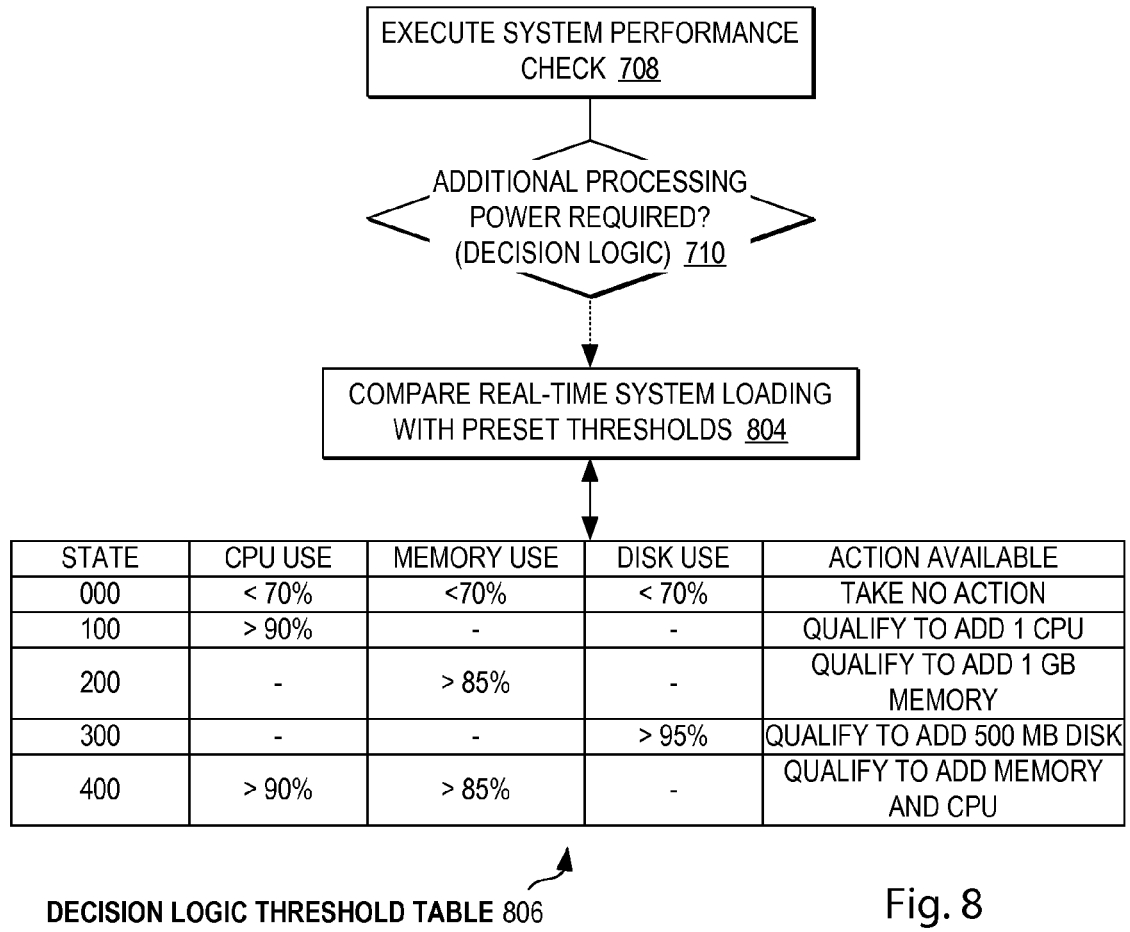
FIG. 8 is a block diagram depicting a threshold specification process in accordance with the method, system, and program of the present invention.
FIG. 9 depicts an example of a table used to decide use of resources based on job priority.

With reference now to FIG. 8, there is depicted a block diagram of a threshold specification process in accordance with the method, system, and program of the present invention. To implement the process of blocks 708 and 710 described in FIG. 7, resource saturation levels are defined in the performance specification such that when performance reaches saturation thresholds, decision making is triggered.

In FIG. 7A, a system performance check is executed at block 708. The performance check may be performed by the resource monitor surveying the current system load on the available resources, including a grid. Then, at block 710, a determination is made whether additional processing power is required. The decision process may be performed by the decision controller. To determine whether additional processing power is required, the process jumps to block 804. While the present example is described with reference to determining whether additional processing power is required, in alternate embodiments, the need for other types of additional resources may be determined. For example, in an alternate embodiment, in addition to determining whether additional processing power is required, the resource scheduler may also determine whether additional memory is required, additional storage space is needed, or a combination of additional resources is required.

To determine whether additional processing power is required, block 804 depicts comparing the real-time system loading with preset performance thresholds. The performance thresholds define performance specifications for a particular job, a particular client, or other entity for which performance specifications are designated. The present performance thresholds are performance specifications that may include quality of service specifications based on service level agreements and objections. A decision logic threshold table 806 provides an example of the types of preset thresholds that may be selected for managing the performance of a grid to maintain expected performance specifications. When the real-time system loading is compared with the thresholds in decision logic threshold table 806, the decision subsystem of the resource schedule determines whether additional processing power is required.

Real-time system loading is preferably compared with the percentage thresholds in decision logic threshold table 806. If, for example the CPU use is 60%, then the system state of "000" is returned and no additional action is available. Thus, at block 710, a determination would be returned that no additional process power is required. If, however, for example, the CPU use is 95%, then the system state of "100" is returned and the job requires additional processing power. As an additional advantage to the present invention, once the system state is established, it is also cached in the decision cache, such that upon submission of the next job or a repeat request for a resource from the same job, a system performance check need not be executed. Rather, the cached system state can be used for the next request and a system performance check need only be performed upon submission of a job with a set of requirements different from the job previously submitted.

It is important to note that while the example of decision logic threshold table 806 includes several categories for comparison to determine system state, the example is merely illustrative of the types of logical elements that may be used to specify the resource saturation levels of the grid and the actions available to be taken upon reaching a resource saturation level. Further, in lieu of a table, alternate types of data management systems may be used to implement decision logic.

Referring now to FIG. 9, there is illustrated an example of a table used to decide use of resources based on job priority. Referring back to FIG. 7A, conditional block 716 requires a determination whether a job is eligible for additional processing power. This step requires the decision controller to determine whether the job qualifies for additional resources based on the job priority or other qualifications. The decision controller may make this decision based on specifications, such as resource eligibility table 900, which specifies eligibility for additional resource based on the job priority. In particular, the decision controller may receive the priority of a job based on input from multiple sources including, but not limited to, a resource scheduler, header data in the job submission stream, or another agent that determines job priority.

Resource eligibility table 900 illustrates one example of a method for specifying eligibility for resources based on the job priority. In the example, each job is rated with a priority number from 1 to 4. For each job priority rating, a particular action is allowed. For example, for a job rated with a priority of "1", the job is eligible for unlimited resources. In FIG. 7A, at conditional block 716, responsive to a determination that the job is rated with a priority of "1" the job would be considered an eligible job. However, for a job rated with a priority of "4", at conditional block 716, the job is not considered eligible for additional resources. It will be understood that other methods for specifying the eligibility of a job for resources may also be implemented.

With reference now to FIG. 10, there is depicted a block diagram of a decision logic cache table in accordance with the method, system, and program of the present invention. As illustrated, a decision logic cache table 1000 records the action executed for the decision code assigned to a system state and job priority. Through use of table 1000, as additional jobs flow through the decision controller, multiple decision steps are reduced as cache hits to system states and job priorities provide a predefined course. In particular, table 1000 is an example construction of a decision logical cache table which may be used to store reusable, previously made decisions. It will be understood that table 1000 is representative of one method in which decision logic may be cached.

In the example, where the system state is "000", FIG. 8 indicates that no action is to be taken. Thus, in previous decisions where the system state was "000", no additional action was taken. Referring back to FIG. 7, the first four entries in table 1000 represent the decisional process of the path from conditional block 710 to action block 712 where no additional processing power is required beyond the resources already allocated for executing the job. When additional job requests are received with the "000" system state and any job priority, then table 1000 may be quickly accessed such that the decision code and previously decided action can be applied.

In addition, in the example, where the system state is "100", FIG. 8 indicates that an additional CPU is allowed. The job priority, as illustrated in FIG. 9, further qualifies the resource eligibility for the job. Thus, for the next job request received during a system state of "100" where the job has a priority of "2", a decision controller may automatically decide to allow 10 additional CPU's based on the previous decision recorded in table 1000 for that system state and job priority. Referring back to FIG. 7, the entries for the system state of "100" and job priority of 1, 2, and 3 in table 1000 represent the decisional process of the path from conditional block 710 to conditional block 716 to conditional block 718. The entry for the system state of "100" and the job priority of 4 in table 1000 represent the decisional process of the path from conditional block 710 to conditional block 716 to action block 722.

While the invention has been particularly shown and described with reference to a preferred embodiment, it will be understood by those skilled in the art that various changes in form and detail may be made therein without departing from the spirit and scope of the invention.

What is claimed is:

1. A computer system for minimizing complex decision making when allocating additional resources to a job submitted in a grid environment, said computer system comprising:
   one or more processors;
   one or more computer-readable tangible storage devices;
   program instructions, stored on at least one of the one or more storage devices for execution by at least one of said one or more processors, for receiving, by a grid management system, a plurality of separate jobs from a plurality of client systems over a network;
   program instructions, stored on at least one of the one or more storage devices for execution by at least one of said one or more processors, for managing, by said grid management system, distribution of each of said plurality of separate jobs to a separate selection of at least one resource of a grid environment comprising a plurality of computing systems each comprising at least one of said at least one resource and communicatively connected over a network through said grid management system to share each said at least one resource through at least one web service layer atop at least one grid service layer implemented within an open grid services architecture;
   program instructions, stored on at least one of the one or more storage devices for execution by at least one of said one or more processors, responsive to said grid management system distributing each of said plurality of separate jobs to said separate selection of said at least one resource, for triggering, by said at least one grid service layer, at least one resource monitor to monitor a performance of said separate selection of said at least one resource in handling each of said plurality of separate jobs to meet a separate performance agreement specified for each of said plurality of separate jobs and for triggering, by said at least one grid service layer, at least one decision controller from said at least one grid service layer to determine whether to allocate additional resources to each of said plurality of separate jobs to meet at least one said separate performance agreement specified for at least one of said plurality of separate jobs;
   program instructions, stored on at least one of the one or more storage devices for execution by at least one of said one or more processors, responsive to said at least one decision controller deciding to allocate additional resources to at least one particular job from among said plurality of separate jobs, for storing, in a memory medium within said grid management system, a record of at least one decision to allocate said additional resources from among said at least one resource to said at least one particular job, wherein said record of said at least one decision is specified by an amount of said at least one resource available for allocation and at least one characteristic of said at least one particular job, wherein said at least one characteristic of said at least one particular job comprises a system state detected by said at least one resource monitor of a particular separate selection of said at least one resource to which said at least one particular job was submitted and a particular priority of said at least one particular job to receive said additional resources from among said at least one resource;
   program instructions, stored on at least one of the one or more storage devices for execution by at least one of said one or more processors, responsive to said at least one decision controller determining whether to allocate said additional resources to a currently submitted job from among said plurality of separate jobs, for comparing, by said grid management system, at least one characteristic of said currently submitted job from among said plurality of separate jobs qualifying for said additional resources from said at least one resource of said grid environment with said at least one characteristic of said at least one particular job in said record in said memory medium, wherein said at least one characteristic of said currently submitted job comprises a system state of a current separate selection of said at least one resource to which said currently submitted job was submitted and a current priority of said currently submitted job to receive said additional resources from among said at least one resource; and
   program instructions, stored on at least one of the one or more storage devices for execution by at least one of said one or more processors, responsive to said at least one characteristic of said currently submitted job matching said at least one characteristic of said at least one particular job in said record, for applying, by said grid management system, said record of said at least one decision associated with said matching job characteristics to control allocation of said additional resources for said currently submitted job, such that complex decision making for allocation of additional resources is minimized by reusing previously stored decisions to allocate additional resources.

2. The computer system according to claim 1 wherein said memory medium comprises a table for storing said record of said at least one decision to allocate said additional resources to each of said at least one previously submitted jobs, each stored according to said at least one characteristic.

3. The computer system according to claim 1 further comprising:
   program instructions, stored on at least one of the one or more storage devices for execution by at least one of said one or more processors, responsive to said at least one characteristic of said currently submitted job not matching said at least one characteristic of said at least one particular job, for deciding whether to allocate said additional resources to said currently submitted job and storing an additional record for said additional decision according to said characteristic of said currently submitted job; and
   program instructions, stored on at least one of the one or more storage devices for execution by at least one of said one or more processors, responsive to said additional decision to allocate said additional resources to said currently submitted job, for deciding which resources to allocate and storing said additional record for said additional decision according to said characteristic of said currently submitted job.

4. The computer system according to claim 1 further comprising:
   program instructions, stored on at least one of the one or more storage devices for execution by at least one of said one or more processors, for organizing a plurality of discrete sets of physical resources into a hierarchy of a plurality of logical resources within said grid environment, wherein said additional resources are allocated from said hierarchy of said plurality of logical resources.

5. A computer program product for minimizing complex decision making when allocating additional resources to a job submitted in a grid environment, the computer program product comprising:
   one or more computer-readable tangible storage devices;
   program instructions, stored on at least one of the one or more storage devices, to receive a plurality of separate jobs from a plurality of client systems over a network at a grid management system;
   program instructions, stored on at least one of the one or more storage devices, to manage distribution from said grid management system of each of said plurality of separate jobs to a separate selection of at least one resource of a grid environment comprising a plurality of computing systems each comprising at least one of said at least resource and communicatively connected over a network through said grid management system to share each said at least one resource through at least one web service layer atop at least one grid service layer implemented within an open grid services architecture;
   program instructions, stored on at least one of the one or more storage devices, responsive to said grid management system distributing each of said plurality of separate jobs to said separate selection of said at least one resource, to trigger at least one resource monitor from said at least one grid service layer to monitor a performance of said separate selection of said at least one resource in handling each of said plurality of separate jobs to meet a separate performance agreement specified for each of said plurality of separate jobs and to trigger at least one decision controller from said at least one grid service layer to determine whether to allocate additional resources to each of said plurality of separate jobs to meet at least one said separate performance agreement specified for at least one of said plurality of separate jobs;
   program instructions, stored on at least one of the one or more storage devices, responsive to said at least one decision controller deciding to allocate said additional resources to at least one particular job from among said plurality of separate jobs, to store, in at least one memory medium of said grid management system, a record of at least one decision to allocate said additional resources from among said at least one resource to said at least one particular job, wherein said record of said at least one decision is specified by an amount of said at least one resource available for allocation and at least one characteristic of said at least one particular job, wherein said at least one characteristic of said at least one particular job comprises a system state detected by said at least one resource monitor of a particular separate selection of said at least one resource to which said at least one particular job was submitted and a particular priority of said at least one particular job to receive said additional resources from among said at least one resource;
   program instructions, stored on at least one of the one or more storage devices, responsive to said at least one decision controller determining whether to allocate said additional resources to a currently submitted job from among said plurality of separate jobs, to compare, by said grid management system, at least one characteristic of said currently submitted job from among said plurality of separate jobs qualifying for said additional resources from said at least one resource of said grid environment with said at least one characteristic of said at least one particular job in said record in said at least one memory medium, wherein said at least one characteristic of said currently submitted job comprises a system state of a current separate selection of said at least one resource to which said currently submitted job was submitted and a current priority of said currently submitted job to receive said additional resources from among said at least one resource; and
   program instructions, stored on at least one of the one or more storage devices, responsive to said at least one characteristic of said currently submitted job matching said at least one characteristic of said at least one particular job in said record, to apply by said grid management system said record of said at least one decision associated with said matching job characteristics to control allocation of additional resources for said currently submitted job, such that complex decision making for allocation of said additional resources is minimized by reusing previously stored decisions to allocate additional resources.

6. The computer program product of claim 5, said computer program product further comprising:
   program instructions, stored on at least one of the one or more storage devices, to store said record of said at least one decision to allocate said additional resources to each of said at least one previously submitted jobs, each stored according to said at least one characteristic in a table of said memory medium.

7. The computer program product of claim 5, said computer program product further comprising:
 program instructions, stored on at least one of the one or more storage devices, responsive to said at least one characteristic of said currently submitted job not matching said at least one characteristic of said at least one particular job, to decide whether to allocate said additional resources to said currently submitted job and storing an additional record for said additional decision according to said characteristic of said currently submitted job; and
 program instructions, stored on at least one of the one or more storage devices, responsive to said additional decision to allocate said additional resources to said currently submitted job, to decide which resources to allocate and storing said additional record for said additional decision according to said characteristic of said currently submitted job.

8. The computer program product of claim 5, said computer program product further comprising:
 program instructions, stored on at least one of the one or more storage devices, to organize a plurality of discrete sets of physical resources into a hierarchy of a plurality of logical resources within said grid environment, wherein said additional resources are allocated from said hierarchy of said plurality of logical resources.

* * * * *

UNITED STATES PATENT AND TRADEMARK OFFICE
CERTIFICATE OF CORRECTION

PATENT NO. : 8,387,058 B2  
APPLICATION NO. : 12/143776  
DATED : February 26, 2013  
INVENTOR(S) : Fellenstein et al.

Page 1 of 1

It is certified that error appears in the above-identified patent and that said Letters Patent is hereby corrected as shown below:

On the Title Page:

(45) Please add --*-- before Feb. 26, 2013

(*) Please add --This patent is subject to a terminal disclaimer.--

Signed and Sealed this  
Twenty-first Day of May, 2013

Teresa Stanek Rea  
*Acting Director of the United States Patent and Trademark Office*